US009312902B1

(12) United States Patent
Visser

(10) Patent No.: US 9,312,902 B1
(45) Date of Patent: Apr. 12, 2016

(54) LINKING A SUBSCRIBER IDENTITY MODULE TO A MOBILE DEVICE

(71) Applicant: Google Inc., Mountain View, CA (US)

(72) Inventor: Frans Visser, Groningen (NL)

(73) Assignee: Google Inc., Mountain View, CA (US)

(*) Notice: Subject to any disclaimer, the term of this patent is extended or adjusted under 35 U.S.C. 154(b) by 21 days.

(21) Appl. No.: 14/258,834

(22) Filed: Apr. 22, 2014

(51) Int. Cl.
*H04B 1/38* (2015.01)
*H04B 1/3816* (2015.01)
*H04B 5/00* (2006.01)
*H04W 4/00* (2009.01)
*H04M 1/00* (2006.01)

(52) U.S. Cl.
CPC ............ *H04B 1/3816* (2013.01); *H04B 5/0031* (2013.01); *H04W 4/008* (2013.01)

(58) Field of Classification Search
CPC ............ H04B 1/3816; H04M 2250/14; H04L 63/0492; H04W 12/06
USPC .................. 455/41.1–41.2, 410–411, 558
See application file for complete search history.

(56) References Cited

U.S. PATENT DOCUMENTS

| | | | | |
|---|---|---|---|---|
| 6,928,299 B1* | 8/2005 | Rinne et al. | ................... | 455/555 |
| 7,949,881 B2* | 5/2011 | Imura | ............................ | 713/186 |
| 8,131,317 B2 | 3/2012 | Lee | | |
| 2004/0203355 A1* | 10/2004 | Light et al. | ................... | 455/41.1 |
| 2011/0269423 A1 | 11/2011 | Schell et al. | | |
| 2013/0165117 A1 | 6/2013 | Narayanan | | |
| 2015/0111573 A1* | 4/2015 | Barton et al. | .............. | 455/435.1 |

OTHER PUBLICATIONS

Chandler, Nathan, "What's an NFC tag?" Mar. 14, 2012 HowStuffWorks.com, http://electronics.howstuffworks.com/nfc-tag.htm 2 pages.
"DOCOMO Develops World's First SIM-based Authentication Mini Device" Jun. 10, 2014 NTT docomo.co.jp https://www.nttdocomo.co.jp/english/info/media_center/pr/2014/0610_00.html 1 page.
"Differences among different NFC tags" Nov. 27, 2012 *Nokia Developer Beta*, http://developer.nokia.com/community/wiki/Differences_among_different_NFC_tag s#Comparison 4 pages.
"How to Select the Right NFC Tag" Apr. 4, 2014 NFCtags.com http://www.nfctags.com/nfc-applications-which-tag 6 pages.
"Near Field Communication" May 16, 2014 Wikipedia.org http://en.wikipedia.org/wiki/Near_field_communication 17 pages.
"NFC Forum Tag Type Technical Specifications" Apr. 4, 2014 NFC-forum.org http://members.nfc-forum.org/specs/spec_list/#tagtypes 1 page.
"NFC Tags" Apr. 4, 2014 *Sunsero* http://www.nevakarten.de/nfc_tags/ 3 pages.

* cited by examiner

*Primary Examiner* — Lee Nguyen
(74) *Attorney, Agent, or Firm* — Shumaker & Sieffert, P.A.

(57) ABSTRACT

A system, device and method for linking SIM data to a mobile device is provided. The system, device and method provide for receiving the SIM data from a source external to the mobile device. Utilizing an NFC interface, the mobile device is capable of receiving the SIM data from an NFC tag embedded within a card, where the NFC tag stores the SIM data. In another embodiment, utilizing an adapter configured for reading the SIM data, the mobile device is configured to receive the SIM data from the adapter over a common interface between the mobile device and the adapter. In yet another embodiment, utilizing an image sensor, the mobile device is configured for receiving the SIM data upon scanning a code.

10 Claims, 8 Drawing Sheets

LINKING A SUBSCRIBER IDENTITY MODULE TO A MOBILE DEVICE

BACKGROUND OF THE INVENTION

Mobile devices that connect to wireless communication subscriber networks typically are identified to the network prior to being granted authorization to access network services. One method of providing the identification is through the use of a Subscriber Identity Module (SIM) card. A typical SIM card contains a memory device and associated circuitry such that the memory device of the SIM card can be read by the mobile device. Typically, the SIM card contains a unique serial number such as an Integrated Circuit Card Identifier (ICCID), an International Mobile Subscriber Identity (IMSI), security authentication and ciphering information, temporary information related to any local network, a list of the services the mobile device user has access to, user contact information and two passwords: a personal identification number (PIN) for ordinary use and a Personal Unblocking Code (PUK) for PIN unlocking.

During operation, a mobile device utilizes the SIM card to access the subscriber network. In doing so, the mobile device accesses the SIM card to obtain the information stored thereon required to utilize services from the subscriber network. In order to access the stored content, the mobile device typically has the SIM card inserted into a physical holder located within the mobile device itself. Accordingly, the mobile device is typically designed with an external slot or SIM card holder capable of receiving the SIM card. Further, the mobile device typically is designed with the attendant circuitry to read the stored contents from the SIM card. The external slot or SIM card holder and the attendant circuitry take up physical space on a circuit board of the mobile device and alter the form factor such that external access to the SIM holder is available from outside of the mobile device. This takes up space on the circuit board and creates structural issues associated with the external access for the SIM card.

BRIEF SUMMARY OF THE INVENTION

One embodiment provides a mobile device, including a processor configured for controlling operation of the mobile device; a network interface configured for communicating over a subscriber network; a card reader interface configured for receiving SIM data from a SIM data storage medium external to the mobile device; and a memory configured to store the SIM data received over the card reader interface.

Another embodiment provides a method of configuring a mobile device to communicate over a subscriber network, the method including initiating a SIM data synchronization process on the mobile device; receiving SIM data from a SIM data storage element external to the mobile device; storing the SIM data locally at a memory device of the mobile device; and connecting a network interface of the mobile device to a subscriber network using the SIM data stored locally at the memory device.

Yet another embodiment provides a non-transitory computer readable storage device for configuring a mobile device to communicate over a subscriber network, the computer readable storage device having computer executable instructions for performing the steps of initiating a SIM data synchronization process on a mobile device on the mobile device; receiving SIM data from a SIM data storage element external to the mobile device; storing the SIM data locally at a memory device of the mobile device; and connecting a network interface of the mobile device to a subscriber network using the SIM data stored locally at the memory device.

DETAILED DESCRIPTION OF THE INVENTION

Mobile devices that connect to wireless communication subscriber networks typically are identified to the network prior to being granted authorization to access network services. Currently, a common method of providing the identification is through the use of a Subscriber Identity Module (SIM) card. A typical SIM card contains a memory device and associated circuitry such that the memory device of the SIM card can be read by the mobile device. Typically, the SIM card contains SIM data, which comprises a unique serial number such as an Integrated Circuit Card Identifier (ICCID), an International Mobile Subscriber Identity (IMSI), security authentication and ciphering information, temporary information related to any local network, a list of the services the mobile device user has access to, user contact information and two passwords: a personal identification number (PIN) for ordinary use and a Personal Unblocking Code (PUK) for PIN unlocking.

During typical operation, a mobile device utilizes the SIM card to access the subscriber network. In doing so, the mobile device accesses the SIM card to obtain the information stored thereon required to utilize services from the subscriber network. In order to access the stored content, the mobile device typically has the SIM card inserted into a physical holder located within the mobile device itself. Accordingly, the mobile device is typically designed with an external slot or SIM card holder capable of receiving the SIM card. Further, the mobile device typically is designed with the attendant circuitry to read the stored contents from the SIM card. The external slot or SIM card holder and the attendant circuitry take up physical space on a circuit board of the mobile device and alter the mobile device's form factor such that external access to the SIM holder is available from outside of the mobile device. This takes up space on the circuit board and creates structural issues associated with the external access for the SIM card.

Therefore, a need exists for storing the SIM data locally at the mobile device while not actually having to insert the SIM card into the mobile device. By doing so, space will be saved for other components to be mounted within the device, and no external openings will be required to accommodate the SIM card. Embodiments of the disclosure provide for storing the SIM data locally at a mobile device without having to insert the SIM card into the mobile device.

Figure 1A:
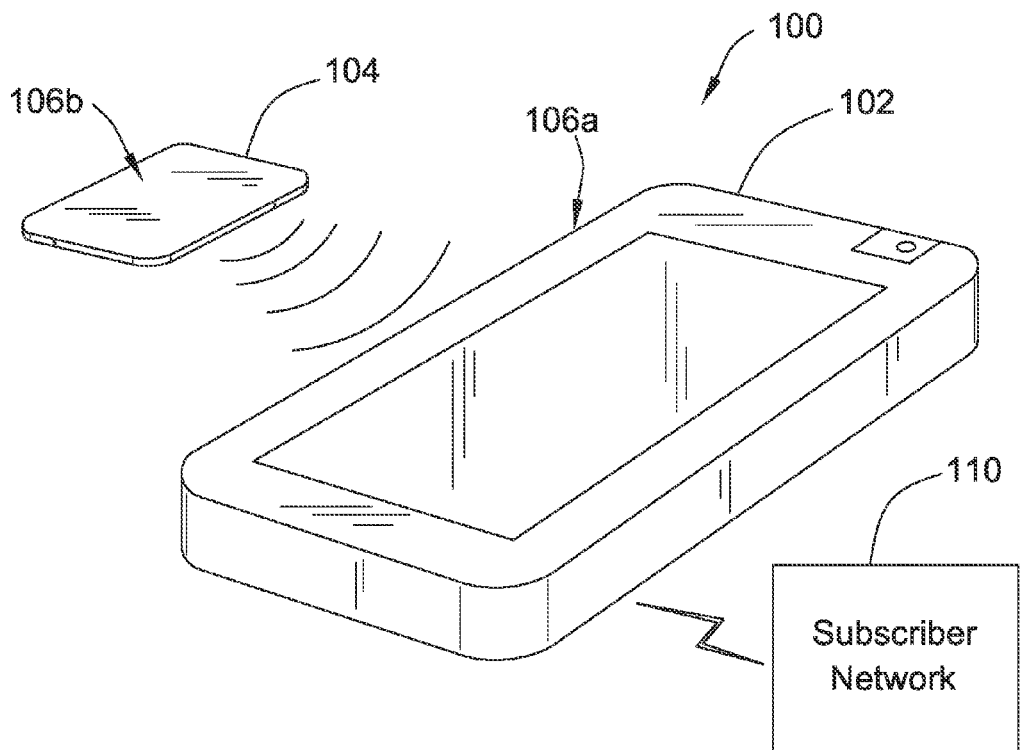
FIG. 1A illustrates a transfer of SIM data from a SIM card to a mobile device, in accordance with an embodiment of the disclosure.
Figure 1B:
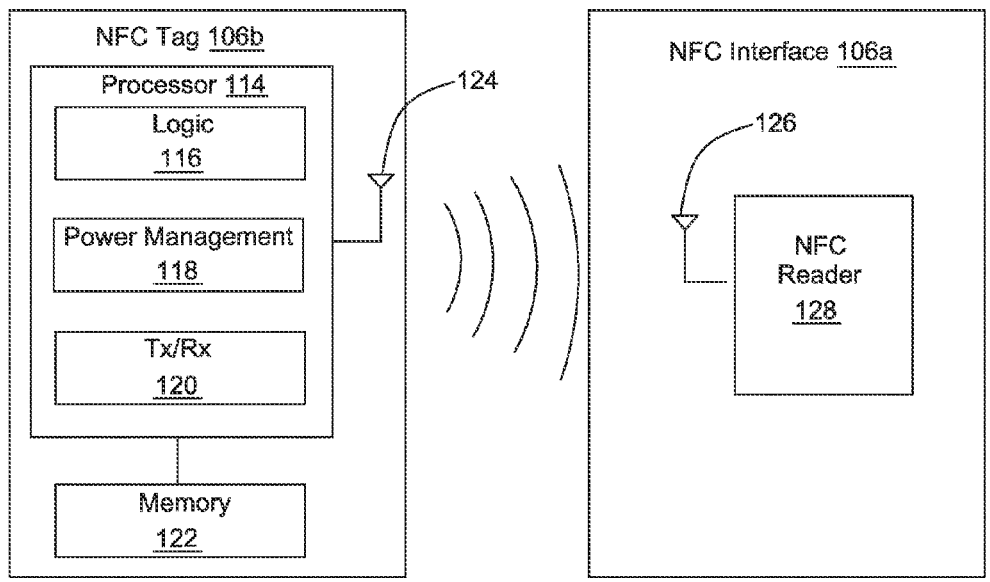
FIG. 1B illustrates the transfer of SIM data from FIG. 1A utilizing an NFC tag and NFC interface, in accordance with an embodiment of the disclosure.

Turning to the figures, FIGS. 1A and 1B illustrate a transfer of SIM data from a SIM data storage element, such as SIM card 104 to a client device in the form of a mobile device 102, according to an embodiment 100 of the disclosure. FIG. 1A, in particular, illustrates an embodiment 100 including a mobile device 102 receiving SIM data from a SIM card 104 over a card reader interface in the form of a Near Field Communication (NFC) interface 106a. The NFC interface 106a couples with a corresponding NFC tag 106b located within the SIM card 104.

The transfer of SIM data occurs as a NFC communication between the NFC tag 106b within the SIM card 104 and the NFC interface 106a of the mobile device 102. As will be further discussed in relation to FIGS. 4, 5 and 7, the NFC communication begins as the NFC tag 106b is brought proximate to the NFC interface 106a, thereby allowing a transfer of the SIM data. The SIM data is then stored locally at the mobile device 102 in order to allow mobile device 102 to access a subscriber network 110 that requires SIM data to access network services. A Global System for Mobile Communication (GSM) network, a Wideband Code Division Multi Access (WCDMA) network, and a Long Term Evolution (LTE) network provide a non-exhaustive list of possible subscriber networks 110 that a user of mobile device 102 may subscribe to and is granted access to via the SIM data.

As an aside, the SIM data includes at least one of the following: a unique serial number such as an Integrated Circuit Card Identifier (ICCID), an International Mobile Subscriber Identity (IMSI), security authentication and ciphering information, temporary information related to any local network, a list of the services the mobile device user has access to, user contact information and two passwords: a personal identification number (PIN) for ordinary use, a Personal Unblocking Code (PUK) for PIN unlocking. The transfer of SIM data from the SIM card 104 to the mobile device 102 may include the entirety or any subset of the SIM data.

FIG. 1B illustrates a block diagram version of the NFC tag 106b coupling with the NFC interface 106a, as discussed in relation to FIG. 1A. In the embodiment illustrated in FIG. 1B, the NFC tag 106b includes a processor 114 coupled to a memory 122 and an antenna 124. The processor 114 includes a logic subsystem 116, a power management subsystem 118 and a Tx/Rx subsystem 120. The logic subsystem 116 provides control for the NFC tag 106b. The power management subsystem 118 manages the power distribution within the NFC tag 106b, and the Tx/Rx subsystem 120 configures the transmission and reception of signals from the antenna 124.

In certain embodiments, during a synchronization process, the NFC tag 106b communicates with the NFC interface 106a by coupling the NFC tag 106b antenna 124 to an antenna 126 of the NFC interface 106a. The antenna 126 is in turn coupled to an NFC reader 128, which communicates with other systems present on the mobile device 102, including a processor 402 (see FIG. 4). In this manner, the NFC interface 106a receives the SIM data from the NFC tag 106b and provides the SIM data to the mobile device 102.

In various embodiments, the NFC tag 106b can vary in terms of data storage space in memory 122 and communication speed over the Tx/Rx subsystem 120 of processor 114. In one embodiment, the memory 122 may be configured to store between 96 bytes and 2 Kbytes of data, and the communication speed over the Tx/Rx subsystem 120 is 106 kbit/sec. In another embodiment, the memory 122 may be configured to store between 48 bytes and 2 Kbytes of data, and the communication speed over the Tx/Rx subsystem 120 is 106 kbit/sec. In another embodiment, the memory 122 may be configured to store up to 1 Mbyte of data, and the communication speed over the Tx/Rx subsystem 120 is 212 kbit/sec. In another embodiment, the memory 122 may be configured to store up to 32 Kbytes of data, and the communication speed over the Tx/Rx subsystem 120 is 106 kbit/sec.

As an aside, the above listed storage capacities and communication speeds are only illustrative of some embodiments. Accordingly, the size of storage of memory 122 and communication speed over the Tx/Rx subsystem 120, in certain embodiments, may be different from the values listed.

Additionally, the data stored in the memory 122 may or may not be encrypted. Also, the memory 122 may or may not be rewritable. In some embodiments, the memory 122 only allows read access. In these embodiments, the SIM data stored on the memory 122 may only be read from the memory 122. In other embodiments, the memory 122 may be rewriteable. In these embodiments, data in addition to the SIM data may be stored to and read from the memory 122.

As an aside, in certain embodiments, the above described NFC communication process may be replaced by a Radio Frequency Identification (RFID) communication process. In the RFID communication process, the system and communication scheme would be similar to the embodiments described above regarding the NFC communication process.

Figure 2:
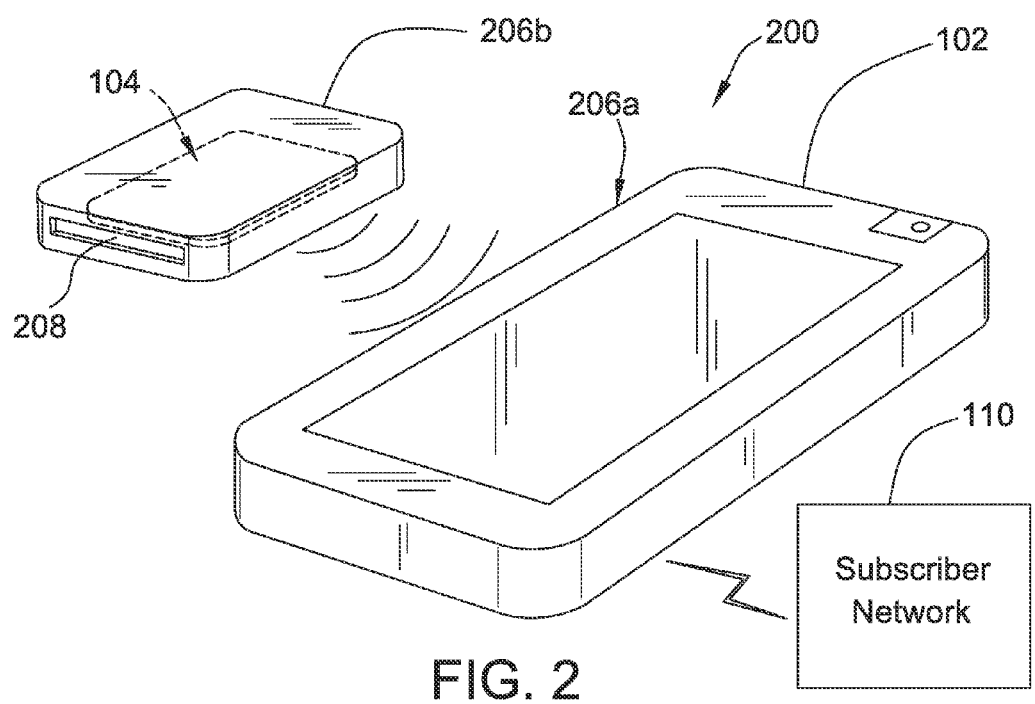
FIG. 2 illustrates a transfer of SIM data from a SIM card to a mobile device, in accordance with another embodiment of the disclosure.

FIG. 2 illustrates an embodiment 200 where the card reader interface 206a of the mobile device 102 receives the SIM data from a SIM card 104 via a card reader adapter 206b. In some embodiments, the card reader adapter 206b is utilized where the SIM card 104 does not include the NFC tag 106b (see FIGS. 1A and 1B) and the mobile device 102 does not include an external slot to insert the SIM card 104.

In embodiment 200, the SIM data is read from the SIM card 104 by the card reader adapter 206b and transmitted to the card reader interface 206a of the mobile device 102 over an associated data connection. As illustrated in FIG. 2, the data connection could be a wireless data connection such as a Bluetooth wireless connection. In this embodiment, the card reader adapter 206b includes a Bluetooth module that pairs with a corresponding Bluetooth module within the mobile device 102. The Bluetooth module within the mobile device 102 would function as the card reader interface 206a.

In another embodiment, the associated data connection between the card reader adapter 206b and the card reader interface 206a could be a wired connection using a data port associated with the mobile device 102.

The card reader adapter 206b includes a port 208 adapted to receive the SIM card 104. As will be discussed more in relation to FIGS. 6 and 7, the card reader includes a SIM card interface that allows the adapter 206b to read the SIM data from the SIM card 104. Once the adapter 206b has read the SIM data, the adapter 206b can begin the transfer of the SIM data to the mobile device 102. Once the SIM data is received by the mobile device 102, as described above in relation to FIG. 1, the mobile device 102 stores the SIM data locally and utilizes it to access various subscriber networks 110.

Figure 3:
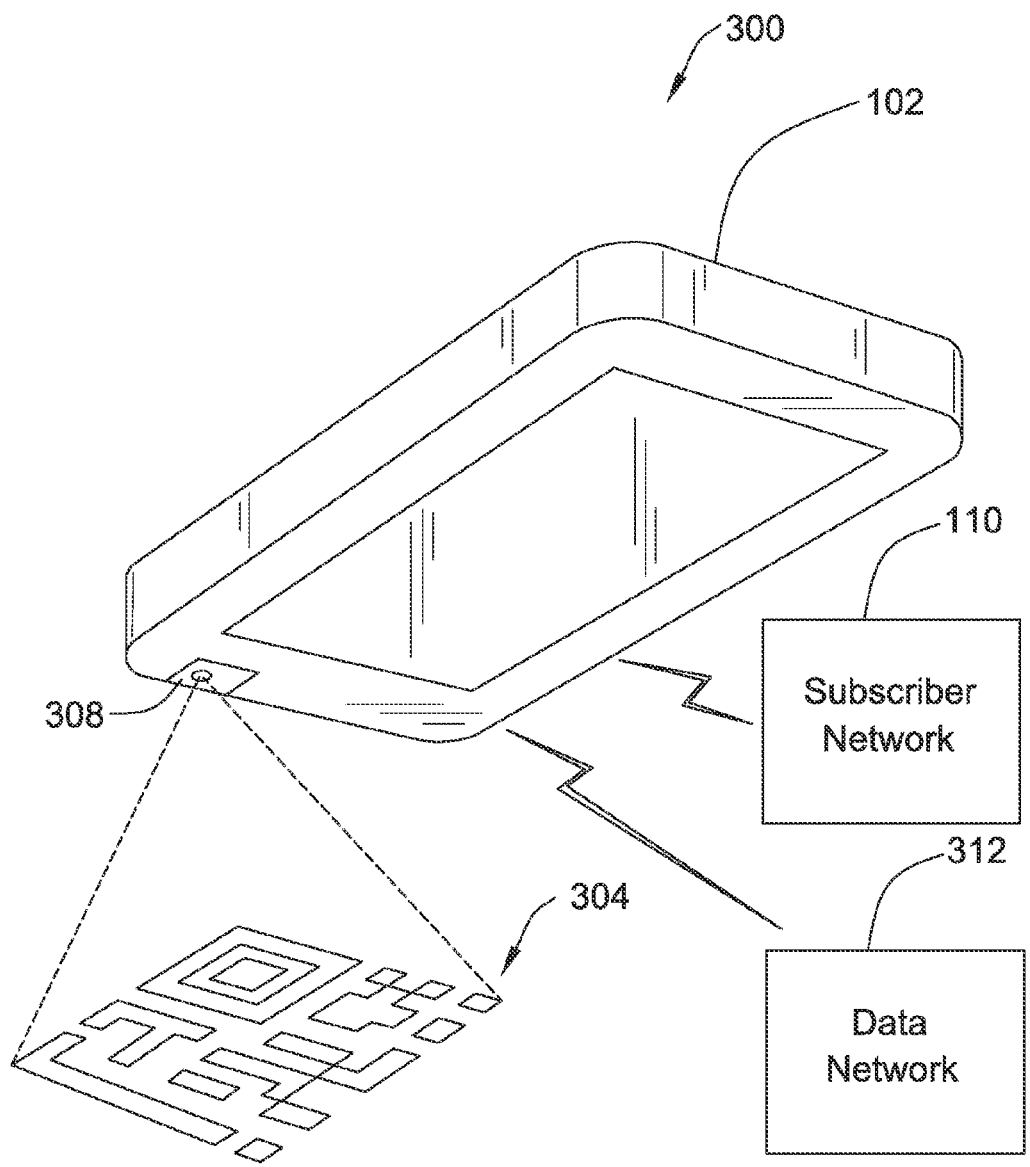
FIG. 3 illustrates a transfer of SIM data to a mobile device, in accordance with an embodiment of the disclosure.

FIG. 3 illustrates an embodiment 300 where a transfer of SIM data to a mobile device 102 occurs upon scanning of a code such as a Quick Response (QR) Code 304. In embodiment 300, the mobile device 102 includes an image sensor 308, which is utilized to capture an image of the QR Code 304 that is in turn decoded by the mobile device 102 to obtain the SIM data. In one embodiment, the QR Code 304 is decoded using Reed-Soloman decoding. In another embodiment, the QR Code 304 contains a coded form of the SIM data that is decoded and then stored locally at the mobile device 102. In this embodiment, the QR Code 304 is the SIM data storage element.

In yet another embodiment, the QR Code 304 contains a link to a location hosted at a remote network containing the SIM data for the mobile device 102, and upon scanning and decoding the QR Code 304, the mobile device 102 is directed to the remote network location to obtain the SIM data. Once the SIM data is obtained, it is stored locally at the mobile device 102 and used to access various subscriber networks 110. Accordingly, in this embodiment, the remote network location acts as the SIM data storage element.

As an aside, in the embodiment where the mobile device 102 is directed to the remote network containing the SIM data, the mobile device 102 may access the remote network either via a data network 312 or over the subscriber network 110. In the embodiment where access to the remote network is gained through the subscriber network 110, the subscriber network 110 recognizes that the mobile device 102 is accessing SIM data and grants special access privileges for the mobile device 102 in absence of having downloaded the SIM data. In this regard, the mobile device 102 is able to access the subscriber network 110 prior to receiving the SIM data, in this limited circumstance.

Additionally, the data network 312 is generally a wireless network. Example networks include but are not limited to Wide Area Networks (WAN) such as a Long Term Evolution (LTE) network, a Global System for Mobile Communications (GSM) network, a Code Division Multiple Access (CDMA) network, Wireless Local Area Networks (WLAN) such as the various IEEE 802.11 standards, or any other kind of data network. The data network 312 allows the mobile device 102 to communicate with the remote network. For example, mobile device 102 may transmit information to the remote network and receive information from the remote network. Data network 312 may include a set of cell towers, as well as a set of base stations and/or mobile switching centers (MSCs). In some embodiments, the data network 312 may include various cell tower/base station/MSC arrangements.

Figure 4:
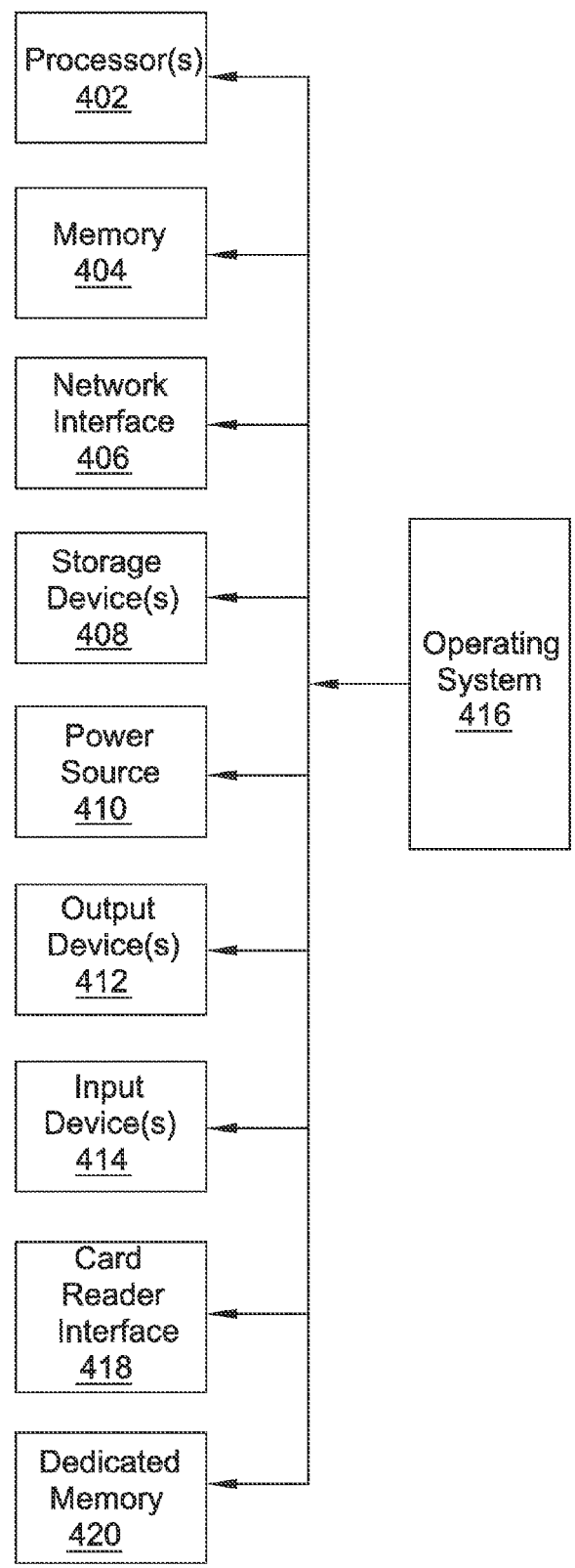
FIG. 4 illustrates a block diagram of various components of a mobile device, in accordance with an embodiment of the disclosure.

FIG. 4 illustrates a block diagram of various components of the mobile device 102, according to certain embodiments. In the various embodiments, the mobile device 102 may be a cellular phone, a smart phone, a tablet device or any device capable of utilizing SIM data to connect to a subscriber network.

In the illustrated embodiment of FIG. 4, the mobile device 102 includes one or more processors 402, memory 404, a network interface 406, one or more storage devices 408, power source 410, one or more output devices 412, one or more input devices 414, a card reader interface 418 and a dedicated memory 420. The mobile device 102 also includes an operating system 416. Each of the components including the processor 402, memory 404, network interface 406, storage device 408, power source 410, output device 412, input device 414, card reader interface 418, dedicated memory 420 and the operating system 416 is interconnected physically, communicatively, and/or operatively for inter-component communications.

As illustrated, processor 402 is configured to implement functionality and/or process instructions for execution within mobile device 102. For example, processor 402 executes instructions stored in memory 404 or instructions stored on a storage device 408 or instructions stored on dedicated memory 420. Memory 404, which may be a non-transitory, computer-readable storage medium, is configured to store information within mobile device 102 during operation. In some embodiments, memory 404 includes a temporary memory, an area for information not to be maintained when the mobile device 102 is turned off. Examples of such temporary memory include volatile memories such as random access memories (RAM), dynamic random access memories (DRAM), and static random access memories (SRAM). Memory 404 also maintains program instructions for execution by the processor 402.

Storage device 408 also includes one or more non-transitory computer-readable storage media. The storage device 408 is generally configured to store larger amounts of information than memory 404. The storage device 408 may further be configured for long-term storage of information. In some examples, the storage device 408 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The mobile device 102 uses network interface 406 to communicate with external devices via one or more networks, one or more wireless networks, and other types of networks through which a communication with the mobile device 102 may be established. Network interface 406 may be a network interface card, such as an Ethernet card, an optical transceiver, a radio frequency transceiver capable of communication with GSM networks, WCDMA networks, LTE networks or any other type of subscriber network, or any other type of device that can send and receive information. Other non-limiting examples of network interfaces include Bluetooth®, 3G and Wi-Fi radios in client computing devices, and USB.

The mobile device 102 includes one or more input devices 414. Input devices 414 are configured to receive input from a user or a surrounding environment of the user through tactile, audio, and/or video feedback. Non-limiting examples of input device 414 include a presence-sensitive screen, a mouse, a keyboard, a voice responsive system, video camera, microphone or any other type of input device. In some examples, a presence-sensitive screen includes a touch-sensitive screen.

The input devices 414 may also include the image sensor 308, as illustrated in embodiment 300 from FIG. 3. As discussed previously, the image sensor 308 is configured for scanning the QR Code 304 prior to receiving the SIM data. Accordingly, in embodiment 300, the image sensor 308 acts as the card reader interface 106a or 206a from the embodiments 100 and 200 in FIGS. 1 and 2, respectively.

As mentioned above, the input devices 414 may include a keypad configured to allow entry of alphanumeric data. In certain embodiments, prior to initiating a transfer of the SIM data from the SIM card 104 to the mobile device 102, entry of a verification code will be required. The verification code is utilized to verify that a user of the mobile device 102 is authorized to transfer the SIM data to the Mobile device 102. The verification could be provided to the user in a variety of ways. For instance, the verification code could be printed on the SIM card 104, the verification code could be printed on a letter associated with the SIM card and received from a service provided managing the subscriber network, or the verification code could be retrieved electronically via email or other electronic access via a user account hosted by the service provider.

One or more output devices 412 are also included in mobile device 102. Output devices 412 are configured to provide output to a user using tactile, audio, and/or video stimuli. Output device 412 may include a display screen (part of the presence-sensitive screen), a sound card, a video graphics adapter card, or any other type of device for converting a signal into an appropriate form understandable to humans or machines. Additional examples of output device 412 include a speaker such as headphones, a cathode ray tube (CRT) monitor, a liquid crystal display (LCD), or any other type of device that can generate intelligible output to a user.

The mobile device 102 includes one or more power sources 410 to provide power to the device. Non-limiting examples of power source 410 include single-use power sources, rechargeable power sources, and/or power sources developed from nickel-cadmium, lithium-ion, or other suitable material.

The mobile device 102 includes an operating system 416. The operating system 416 controls operations of the components of the mobile device 102. For example, the operating system 416 facilitates the interaction of the processor(s) 402, memory 404, network interface 406, storage device(s) 408, input device 414, output device 412, power source 410, card reader interface 418 and dedicated memory 420.

In certain embodiments, the mobile device 102 includes the card reader interface 418. The card reader interface 418 is configured for receiving the SIM data from the SIM card 104 (see FIGS. 1 and 2). Accordingly, in certain embodiments, the card reader interface 418 may be an NFC interface 106a, as illustrated in FIG. 1, or in other embodiments, the card reader interface 418 may be a Bluetooth interface 206a or wired connection that receives the SIM data from the adapter 206b, as illustrated in FIG. 2.

In the embodiment where the card reader interface 418 is the NFC interface 106a, the card reader interface 418 includes an NFC reader module and an NFC enabled antenna. The NFC enable antenna is configured to couple with an NFC antenna located within the SIM card 104, and the NFC reader module is configured to read the SIM data transferred from the NFC tag 106b within the SIM card 104.

In certain embodiments, the mobile device 102 includes the dedicated memory 420. Dedicated memory 420 may be a separate memory device integrated into the electrical architectural design of the mobile device 102 or may be a dedicated portion of memory 404 or a dedicated portion of storage device 408. In any event, the dedicated memory 420 is configured to store the SIM data received from the SIM card 104. As the SIM data is secure data required for a mobile device 102 to access a subscriber network, the SIM data should be stored in a location within the mobile device 102 that will not be corrupted by other programs or applications operating on the mobile device 102. The dedicated memory 420 provides such a secure location for the mobile device 102 to store the SIM data such that it can be accessed when necessary in order to provide the mobile device's access credentials to the subscriber network. In this regard, the dedicated memory 420 is a secured dedicated memory.

As an aside, beyond storing the SIM data in a secure location, the SIM data may be encrypted prior to storage. In this regard, an unauthorized user of the mobile device 102 will not be able to read the encrypted SIM data from the dedicated memory 420.

Figure 5:
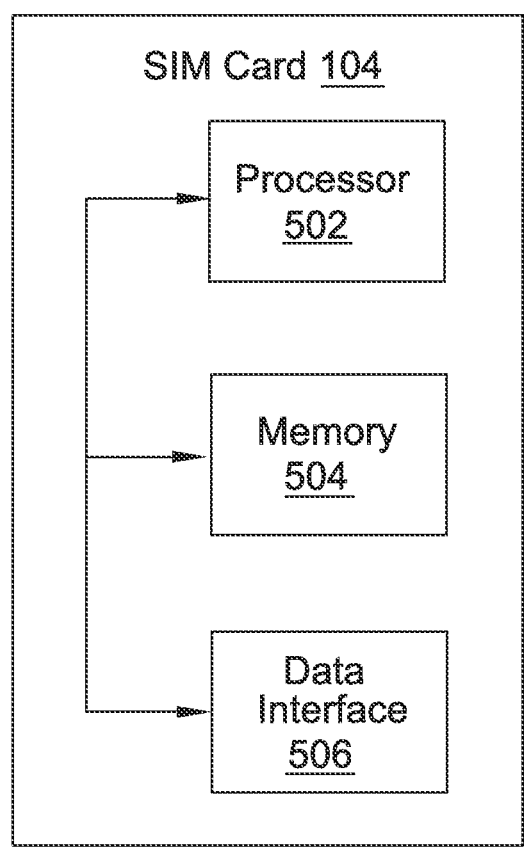
FIG. 5 illustrates a block diagram of various components of a SIM card, in accordance with an embodiment of the disclosure.

FIG. 5 illustrates a block diagram of various components of the SIM card 104, according to embodiments of the disclosure. In the embodiment of the SIM card 104 illustrated in FIG. 5, the SIM card 104 includes a processor 502, a memory 504 and a data interface 506.

As an aside, typically, a traditional SIM card has different dimensions associated with the various varieties of SIM card. Traditionally, SIM cards are considered a Full-size SIM, a Mini-SIM, a Micro-SIM or a Nano-SIM. The Full-size SIM is approximately 85.6 mm in height, 53.98 mm in width and 0.76 mm in depth. The Mini-SIM is approximately 25 mm in height, 15 mm in width and 0.76 mm in depth. The Micro-SIM is approximately 15 mm in height, 12 mm in width and 0.76 mm in depth. The Nano-SIM is approximately 12.3 mm in height, 8.8 mm in width and 0.67 mm in depth. In certain embodiments of the disclosure, the SIM card 104 is not designed to be inserted into mobile device 102. Accordingly, the SIM card 104 may have similar dimensions to those mentioned above, or dimensions optimized for the various modes of communicating the SIM data from the SIM card 104 to the mobile device 102—such as an NFC communication scheme. In that regard, the above dimensions are not required dimensions for the SIM card 104.

Returning to FIG. 5, the processor 502 manages the SIM data stored within the memory 504. Upon request, the processor 502 may query the memory 504 for the various SIM data and provide that data to a separate device over the data interface 506.

In a typical SIM card, the data interface 506 includes a six pins: SIMclk (clock signal), SIMdata (data signal), SIMrst (reset signal), NC (no connect), VSIM (power) and GND (ground). In embodiment 200, illustrated in FIG. 2, the adapter 206b includes a corresponding SIM card interface 604 (see FIG. 6) designed to read the SIM data from the data interface 506 and provide the SIM data to the mobile device 102.

However, in embodiment 100, illustrated in FIG. 1, the processor 502, the memory 504 and the data interface 506 are included in NFC tag 106b. In this embodiment, the data interface 506 does not require the pin interface of embodiment 200, discussed above. Rather, the NFC tag 106b includes attendant circuitry to store the SIM data and send the SIM data to the mobile device 102 by coupling an antenna embedded within the SIM card 104 to an antenna associated with an NFC interface 106a of the mobile device 102. Once the NFC tag 106b and the NFC interface 106a are coupled, the SIM data may be transferred over the NFC connection between the SIM card 104 and the mobile device 102.

Figure 6:
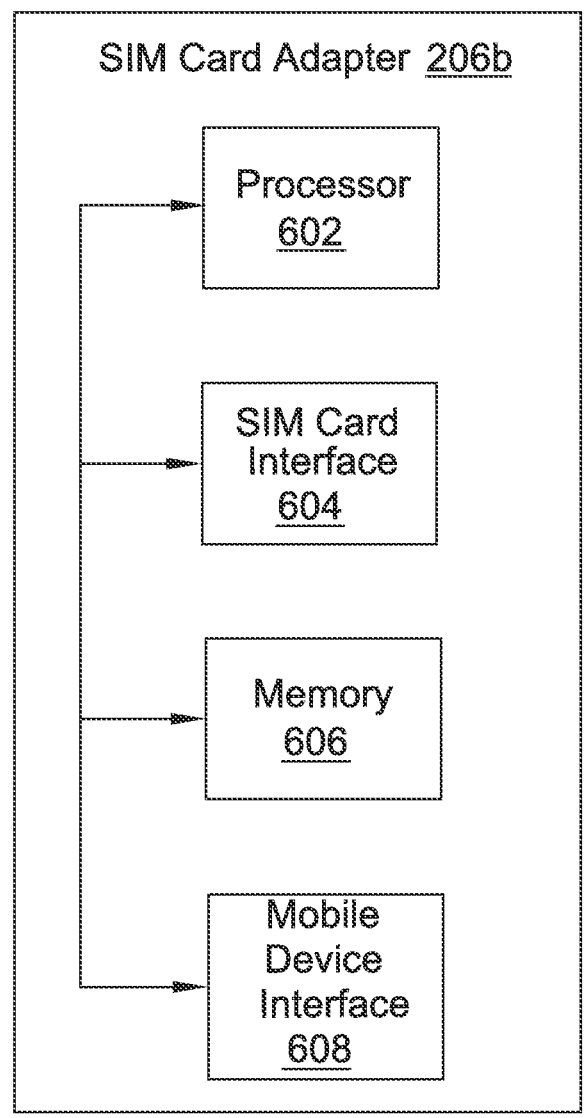
FIG. 6 illustrates a block diagram of a SIM card adapter, in accordance with an embodiment of the invention.

FIG. 6 illustrates a block diagram of the SIM card adapter 206b from embodiment 200 (see FIG. 2). In some embodiments, the SIM card adapter 206b is utilized to transfer the SIM data from a SIM card 104 to the mobile device 102 in situations where the SIM card 104 does not include the NFC tag 106b (see FIGS. 1A and 1B) and the mobile device 102 does not have an external slot to enter the SIM card 104. For instance, as discussed in relation to FIG. 5, the data interface 506 of SIM card 104 may include the six pin interface and the SIM data is typically ported from the SIM card 104 six pin interface to the SIM card adapter 206b. In turn, the SIM card adapter 206b then transmits the SIM data to the mobile device 102, as discussed below and in relation to FIG. 2.

The adapter 206b includes a processor 602, a SIM card interface 604, a memory 606 and a mobile device interface 608. The SIM card interface 604, as discussed above in relation to the data interface 506 of the SIM card 104, reads the SIM data from the SIM card 104. After being read from the SIM card 104, the SIM data is stored in memory 606.

The adapter 206b further includes a mobile device interface 608, which in certain embodiments may be a Bluetooth interface or a wired interface to the mobile device 102. After establishing a connection with the mobile device 102, the processor 602 of the adapter 206b will read the SIM data from the memory 606 and configure the SIM data to be transmitted over the mobile device interface 608.

Figure 7:
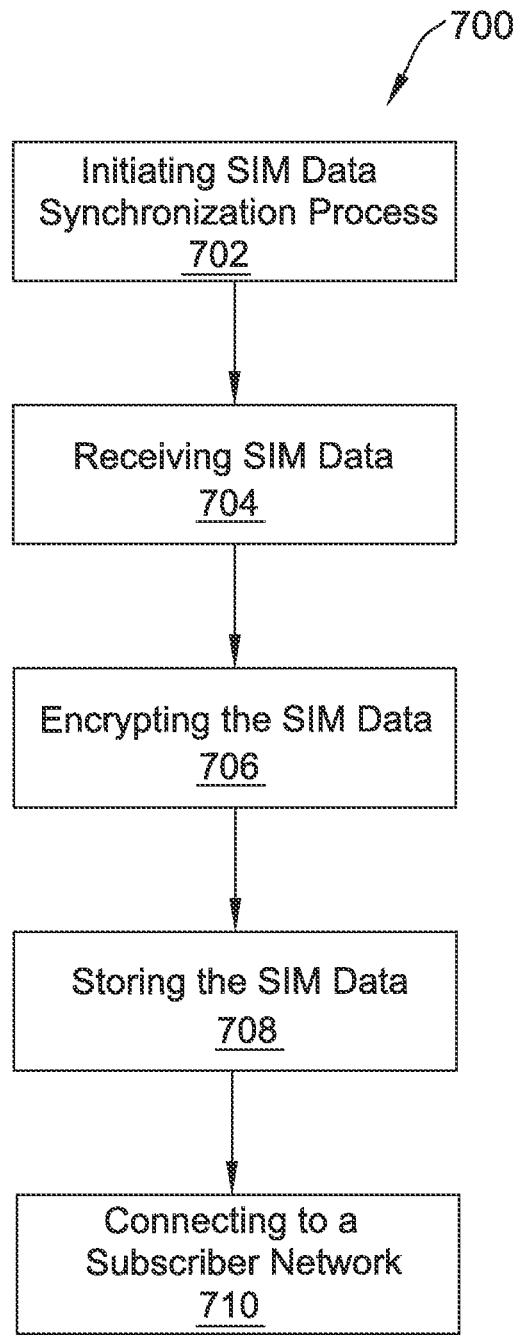
FIG. 7 illustrates a flow chart of a method of configuring a mobile device to communicate over a subscriber network, in accordance with embodiments of the disclosure.

FIG. 7 illustrates a flow chart of a method 700 of configuring a mobile device to communicate over a subscriber network, in accordance with embodiments of the disclosure. At step 702, the mobile device 102 (see FIGS. 1A and 2) initiates a SIM data synchronization process, which synchronizes the mobile device 102 with the SIM data storage medium. This initialization could occur upon initially setting up the mobile device 102 at the time of purchase, or could be triggered by a menu option in settings accessed by the operating system 416 (see FIG. 4).

Alternatively, in embodiment 100 (see FIGS. 1A and 1B), the SIM data synchronization process could be initiated upon coupling the NFC tag 106b of the SIM card 104 to the NFC interface 106a of the mobile device 102. In this embodiment, the synchronization process would be pairing between the NFC tag 106b and the NFC interface 106a of the mobile device 102.

Rather than the SIM data synchronization process automatically initiating upon coupling, in certain embodiments, a verification code may be required to begin the synchronization process. In this embodiment, the verification code would need to be entered prior the actual synchronization beginning. The verification code could be printed on the SIM card 104, could be mailed to a user of the mobile device 102 or provided to the user utilizing an electronic communication means such as email or a subscription portal hosted by the service provider for the subscriber network.

Similarly, in embodiment 200, the SIM data synchronization process could be initiated upon coupling the Bluetooth interface or wired interface of the SIM card adapter 206b (see FIG. 2) to the corresponding Bluetooth interface or wired interface 206a of the mobile device 102. Additionally, in other embodiments, rather than the SIM data synchronization process automatically initiating upon coupling, a verification code may be required to begin the synchronization process. In this embodiment, the verification code would need to be entered prior the actual synchronization beginning. The verification code could be printed on the SIM card 104, could be mailed to a user of the mobile device 102 or provided to the user utilizing an electronic communication means such as email or a subscription portal hosted by the service provider for the subscriber network.

At step 704, the mobile device 102 (see FIGS. 1A and 2) receives the SIM data over the NFC interface 106a or from the adapter 206b. In certain embodiments, after receiving the SIM data, the mobile device 102 may encrypt the SIM data, at step 706, such that the SIM data is secured prior to storage on the mobile device 102. However, in other embodiments, step 706 is not required.

After encrypting the SIM data, the mobile device 102 stores the SIM data at step 708. Depending on what various types of memory are associated with the mobile device 102, the SIM data may be stored in general system memory 404, in storage device 408 or in dedicated memory 420.

Once the SIM data is stored, the mobile device 102 is able to use the SIM data to connect to a subscriber network 110 (see FIG. 1A) at step 710. At step 710, the mobile phone 102 accesses the stored SIM data whenever a subscriber network requests various access credentials from the mobile device 102.

Figure 8:
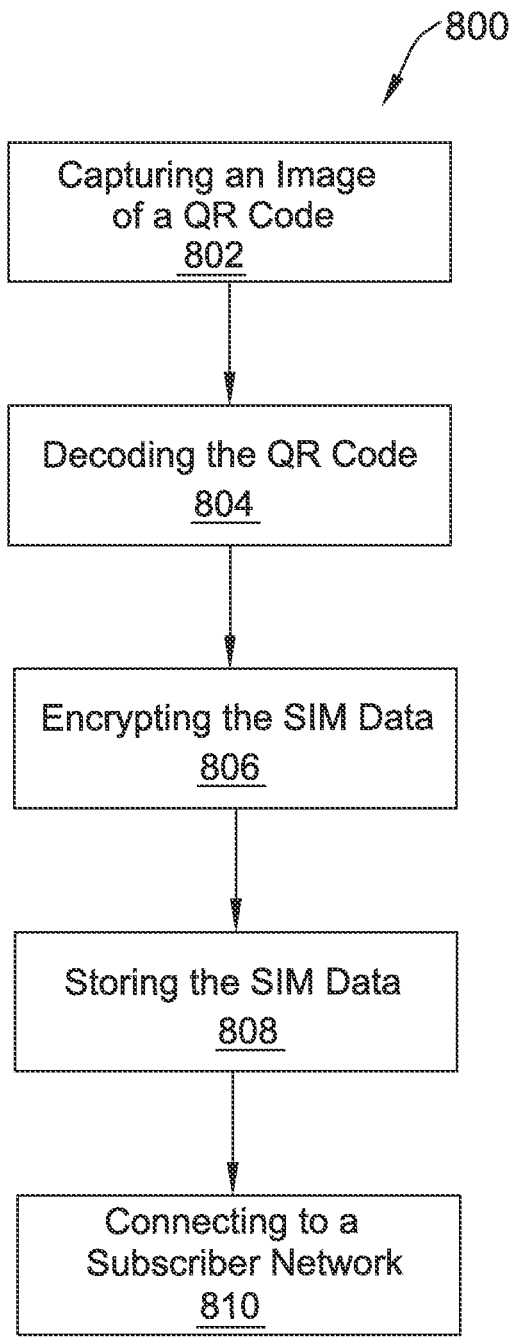
FIG. 8 illustrates a flow chart of another method of configuring a mobile device to communicate over a subscriber network, in accordance with an embodiment of the disclosure.

FIG. 8 illustrates a flow chart of method 800 of configuring a mobile device to communicate over a subscriber network, in accordance with an embodiment of the disclosure. Method 800 is in accordance with embodiment 300 from FIG. 3.

At step 802, a mobile device 102 captures an image of a QR Code by utilizing image sensor 308 (see FIG. 3), and at step 804, the mobile device 102 decodes the QR Code. In one embodiment, the QR Code contains the actual SIM data, and upon decoding, the mobile device 102 is able to obtain the SIM data. In another embodiment, the QR Code contains a link to a network address that the mobile device 102 connects to using the network interface 406 (see FIG. 4). The SIM data is stored at the network address and available for the mobile device 102.

In either of the above embodiments, the SIM data may be optionally encrypted at step 806 and stored locally at the mobile device 102, at step 808. Depending on what various types of memory are associated with the mobile device 102, the SIM data may be stored in general system memory 404, in storage device 408 or in dedicated memory 420.

Once the SIM data is stored, the mobile device 102 is able to use the SIM data to connect to a subscriber network 110 (see FIG. 3) at step 810. At step 810, the mobile phone 102 accesses the stored SIM data whenever a subscriber network 110 requests various access credentials from the mobile device 102.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A mobile device, comprising:
a processor;
a network interface;
an input device that receives a verification code;
a near field communication interface; and
a memory,
wherein the processor verifies, based on the verification code, that a user of the mobile device is authorized to transfer subscriber identity module data from a near field communication tag to the mobile device, wherein the subscriber identity module data is stored in memory of the near field communication tag, and wherein the subscriber identity module data includes information used by the mobile device to access a subscriber network,
wherein the near field communication interface receives, after the processor verifies that the user is authorized to transfer the subscriber identity module data, the subscriber identity module data from the near field communication tag, and
wherein the processor stores, in the memory of the mobile device, the subscriber identity module data and configures, based on the subscriber identity module data, the mobile device to access, using the network interface, the subscriber network.

2. The mobile device of claim 1, wherein the near field communication tag is internal to a subscriber identity module card.

3. The mobile device of claim 2, wherein the near field communication interface receives the subscriber identity module data from the near field communication tag when the subscriber identity module card is proximate the mobile device.

4. The mobile device of claim 1, wherein the memory of the mobile device is a secure dedicated memory device configured for storing the subscriber identity module data separately from other data stored locally at the mobile device.

5. A method comprising:
receiving, by a mobile device, a verification code;
verifying, by the mobile device and based on the verification code, that a user of the mobile device is authorized to transfer subscriber identity module data from a near field communication tag to the mobile device, wherein the subscriber identity module data is stored in memory of the near field communication tag, and wherein the subscriber identity module data includes information used by the mobile device to access a subscriber network;
responsive to verifying that the user of the mobile device is authorized to transfer the subscriber identity module data, receiving, by the mobile device and using a near field communication interface, subscriber identity module data from the near field communication tag;
storing, by the mobile device, the subscriber identity module data in a memory of the mobile device; and
configuring, by the mobile device and based on the subscriber identity module data stored in the memory of the mobile device, the mobile device to access the connecting a network subscriber network.

6. The method of claim 5, wherein the memory is a secured memory dedicated for storing the subscriber identity module data.

7. The method of claim 5, further comprising encrypting the subscriber identity module data prior to storing the subscriber identity module data in the memory of the mobile device.

8. A non-transitory computer readable storage device encoded with instructions that, when executed, cause one or more processors of a mobile device to:
receive a verification code;
verify, based on the verification code, that a user of the mobile device is authorized to transfer subscriber identity module data from a near field communication tag to the mobile device, wherein the subscriber identity module data is stored in memory of the near field communication tag, and wherein the subscriber identity module data includes information used by the mobile device to access a subscriber network;
responsive to verifying that the user of the mobile device is authorized to transfer the subscriber identity module data, receive, by the mobile device and using a near field communication interface, subscriber identity module data from the near field communication tag;
storing the subscriber identity module data in a memory of the mobile device; and
configure, based on the subscriber identity module data stored in the memory of the mobile device, the mobile device to access the subscriber network.

9. The non-transitory computer-readable storage device of claim 8, wherein the memory of the mobile device is a secured memory dedicated for storing the subscriber identity module data.

10. The non-transitory computer-readable storage device of claim 8, wherein the instructions further cause the one or more processors to encrypt the subscriber identity module data prior to storing the subscriber identity module data in the memory of the mobile device.

* * * * *